United States Patent [19]

Shinoda et al.

[11] Patent Number: 5,255,180
[45] Date of Patent: Oct. 19, 1993

[54] CONTROL APPARATUS FOR SYSTEMATICALLY OPERATING AUDIO AND/OR VIDEO SETS

[75] Inventors: Hatsuhiko Shinoda, Tokyo; Yosuke Yukihira, Kanagawa; Kazutoshi Matsumoto, Saitama, all of Japan

[73] Assignee: Sony Corporation, Japan

[21] Appl. No.: 726,808

[22] Filed: Jul. 8, 1991

[30] Foreign Application Priority Data

Aug. 10, 1990 [JP] Japan .................................. 2-212596

[51] Int. Cl.$^5$ ............................................. G05B 19/02
[52] U.S. Cl. ................................ 364/140; 340/825.24; 340/825.69; 358/194.1; 455/352; 364/138
[58] Field of Search ................ 364/140, 141, 138, 139, 364/131–134, 400; 340/825.24, 825.25, 825.69, 825.72; 358/194.1, 181, 335, 191.1; 370/73, 124; 455/166.1, 184.1, 186.1, 4.1, 352–355; 359/146

[56] References Cited

U.S. PATENT DOCUMENTS

| | | |
|---|---|---|
| 4,626,847 | 12/1986 | Zato ........................... 340/825.24 X |
| 4,808,992 | 2/1989 | Beyers, Jr. et al. ............ 340/825.24 |
| 4,907,079 | 3/1990 | Turner et al. .................... 358/181 X |
| 5,097,249 | 3/1992 | Yamamoto ................. 340/825.72 X |
| 5,182,552 | 1/1993 | Paynting ..................... 340/825.72 X |

FOREIGN PATENT DOCUMENTS 0325331 7/1989 European Pat. Off. .
0371749 6/1990 European Pat. Off. .
2204755 11/1988 United Kingdom .

Primary Examiner—Joseph Ruggiero
Attorney, Agent, or Firm—Ronald P. Kananen

[57] ABSTRACT

An audiovisual system includes audio, video, and/or audiovisual components and microcomputers for controlling the components, respectively. When one of the components is operated on, data is sent from the corresponding microcomputer to a main microcomputer. The main microcomputer transmits a control signal to those microcomputers for one or some of the other components to put those components in operation in relation to the operation of the component that has been operated on.

3 Claims, 5 Drawing Sheets

CONTROL APPARATUS FOR SYSTEMATICALLY OPERATING AUDIO AND/OR VIDEO SETS

BACKGROUND OF THE INVENTION

1. Field of the Invention

The present invention relates to a control apparatus for operating an audiovisual (AV) system which comprises an amplifier, a display monitor, a television tuner, a video tape recorder (VTR), a compact disc player, loudspeakers, and other components.

2. Description of the Prior Art

Audiovisual systems are now in wide use among consumers. The audiovisual systems comprise an amplifier, a display monitor, a television tuner, a video tape recorder (VTR), a compact disc player, loudspeakers, and other components, for example. These audiovisual system components have output terminals for outputting video signals and audio signals, the output terminals being connected to a selector through cables. The selector also has video and audio signal output terminals which are coupled to video and audio signal input terminals of the display monitor, the VTR, and the amplifier through cables.

The selector operates to supply video and/or audio signals from a selected one of the components to another selected component for displaying a video image and/or reproducing audible sounds. For example, when the user manually operates the selector to select the compact disc player, the audio signal from the compact disc player is supplied to the amplifier by the selector. When the VTR is selected through manual operation of the selector, the video and audio signals from the VTR are supplied to the display monitor and the amplifier, respectively, by the selector. Upon manual selection of the television tuner with the selector, the video signal from the television tuner is supplied to the display monitor and the audio signal from the television tuner is supplied to the amplifier. The audio signal supplied to the amplifier is amplified and supplied to the loudspeakers which then reproduces audible sounds. The video signal fed to the display monitor is displayed as a video image on the screen of the display monitor. Therefore, the user of the audiovisual system can watch the displayed image while listening to the sounds radiated from the loudspeakers. With the use of the audiovisual system, the user is able to enjoy displayed video images or television broadcasts reproduced with a lot of presence.

To watch a television broadcast, for example, the power switch of the display monitor is turned on, then the power switch of the amplifier is turned on, and thereafter the power switch of the selector is turned on. Then, a television mode is selected by a selection switch on the selector, the power switch of the television tuner is turned on, and the television tuner is operated on to select a desired television station.

To reproduce video images on the VTR, the power switch of the display monitor is turned on, then the power switch of the amplifier is turned on, and thereafter the power switch of the selector is turned on. Then, a VTR mode is selected by the selection switch on the selector, the power switch of the VTR is turned on, and a playback switch on the VTR is turned on to place the VTR in a playback mode.

To play back a compact disc on the compact disc player, the power switch of the amplifier is turned on, then the power switch of the selector is turned on, and thereafter a compact disc player mode is selected by the selection switch on the selector. The power switch of the compact disc player is turned on, and a playback switch on the compact disc player is turned on to select a playback mode thereof.

As described above, the conventional audiovisual systems have required the user to carry out a complex process, which involves many manual steps, until video images and sounds are actually reproduced by the systems. Consequently, the user has found it cumbersome to operate on the audiovisual system.

OBJECTS AND SUMMARY OF THE INVENTION

In view of the aforesaid drawbacks of the prior audiovisual systems, it is an object of the present invention to provide a control apparatus for systematically controlling an audiovisual system so that the user is able to watch video images and listen to sounds through a simple process.

According to the present invention, there is provided a control apparatus for controlling a system having a plurality of components to be operated on, comprising main control means for controlling one of the components, and a plurality of auxiliary control means for controlling the other components, respectively, each of the auxiliary control means comprising means responsive to operation of the corresponding one of the other components, for transmitting information about the operation of the corresponding component to the main control means, the main control means comprising means for supplying a control signal relative to the operation to the auxiliary control means to control the components to operate in relation to the operation.

According to the present invention, there is also provided a control apparatus for controlling a system having a plurality of components to be operated on, comprising a plurality of control means for controlling the components, respectively, each of the control means comprising means responsive to operation of the corresponding one of the components, for transmitting information about the operation of the corresponding component to the other control means, and means for supplying a control signal relative to the operation to the other control means to control the components to operate in relation to the operation.

The system comprises an audiovisual system, the components comprise audio, video, and/or audiovisual components, and each of the control means comprises a microcomputer.

The above and other objects, features, and advantages of the present invention will become apparent from the following description of illustrative embodiments thereof to be read in conjunction with the accompanying drawings, in which like reference numerals represent the same or similar objects.

DETAILED DESCRIPTION OF THE PREFERRED EMBODIMENT

Figure 1:
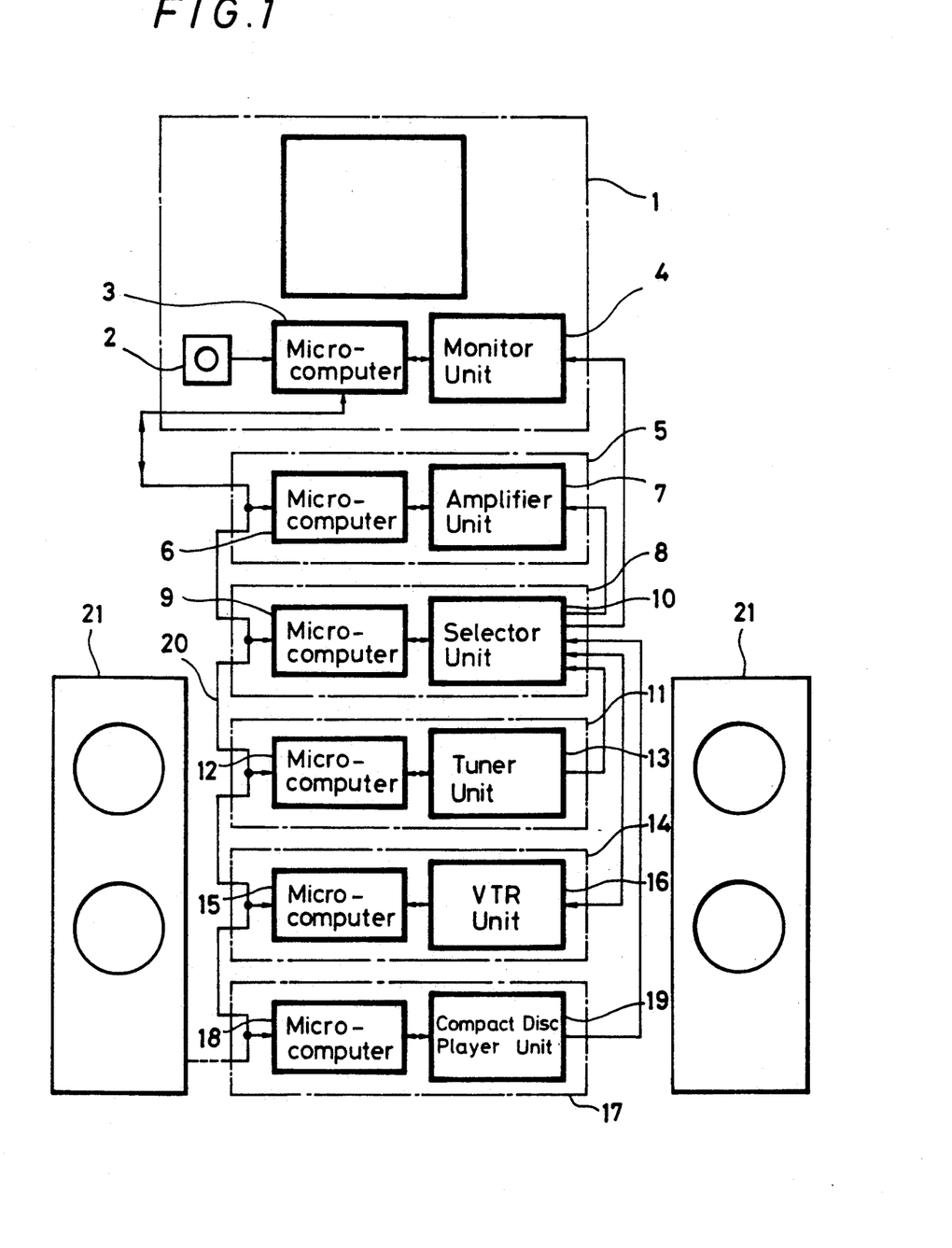
FIG. 1 is a block diagram of a control apparatus according to the present invention, which is incorporated in an audiovisual system.

FIG. 1 shows a control apparatus according to the present invention, which is incorporated in an audiovisual system.

As shown in FIG. 1, the audiovisual system includes a display monitor 1 which comprises a photosensor 2, a monitor unit 4, and a microcomputer 3 for controlling the monitor unit 4. The photosensor 2 detects command data transmitted from an infrared remote commander (not shown) and supplies the detected command data to the microcomputer 3. The monitor unit 4 has a video signal input terminal connected to a video signal output terminal of a selector unit 10 of a selector 8 (described later).

The audiovisual system also has an amplifier 5 which comprises an amplifier unit 7 and a microcomputer 6 for controlling the amplifier unit 7. The amplifier unit 7 has an audio signal input terminal connected to an audio signal output terminal of the selector unit 10. The amplifier unit 7 has signal output terminals connected to loudspeakers 21.

A television tuner 11 comprises a tuner unit 13 and a microcomputer 12 for controlling the tuner unit 13. The tuner unit 13 has video and audio signal output terminals connected to video and audio signal input terminals, respectively, of the selector unit 10.

A video tape recorder (VTR) 14 comprises a VTR unit 16 and a microcomputer 15 for controlling the VTR unit 16. The VTR unit 16 has video and audio signal output terminals connected to video and audio signal input terminals, respectively, of the selector unit 10.

A compact disc player 17 comprises a compact disc player unit 19 and a microcomputer 18 for controlling the compact disc player unit 19. The compact disc player unit 19 has an audio signal output terminal connected to an audio signal input terminal of the selector unit 10.

The selector 8 has, in addition to the selector unit 10, a microcomputer 9 serving as a main control means for supplying control signals to the microcomputers 3, 6, 12, 15, 18 of the display monitor 1, the amplifier 5, the television tuner 11, the VTR 14, and the compact disc player 17, respectively. The microcomputer 9 also controls the selector unit 10. The selector unit 10 is either controlled by the microcomputer 9 or manually operated on by selector switches (not shown) on the selector 8 to supply video and audio signals from the television tuner 11 and the VTR 14 to the display monitor 1 and the amplifier 5, to supply an audio signal from the compact disc player 17 to the amplifier 5, and to supply video and audio signals from the television tuner 11 to the VTR 14.

The microcomputers 3, 6, 9, 12, 15, 18 are connected parallel to each other through input and output ports thereof by a bus line 20. When the display monitor 1, the amplifier 5, the television tuner 11, the VTR 14, and the compact disc player 17 are operated on, the microcomputers 3, 6, 12, 15, 18 thereof supply data indicative of the details of the operation through the bus line 20 to the microcomputer 9 of the selector 8.

Figure 2A:
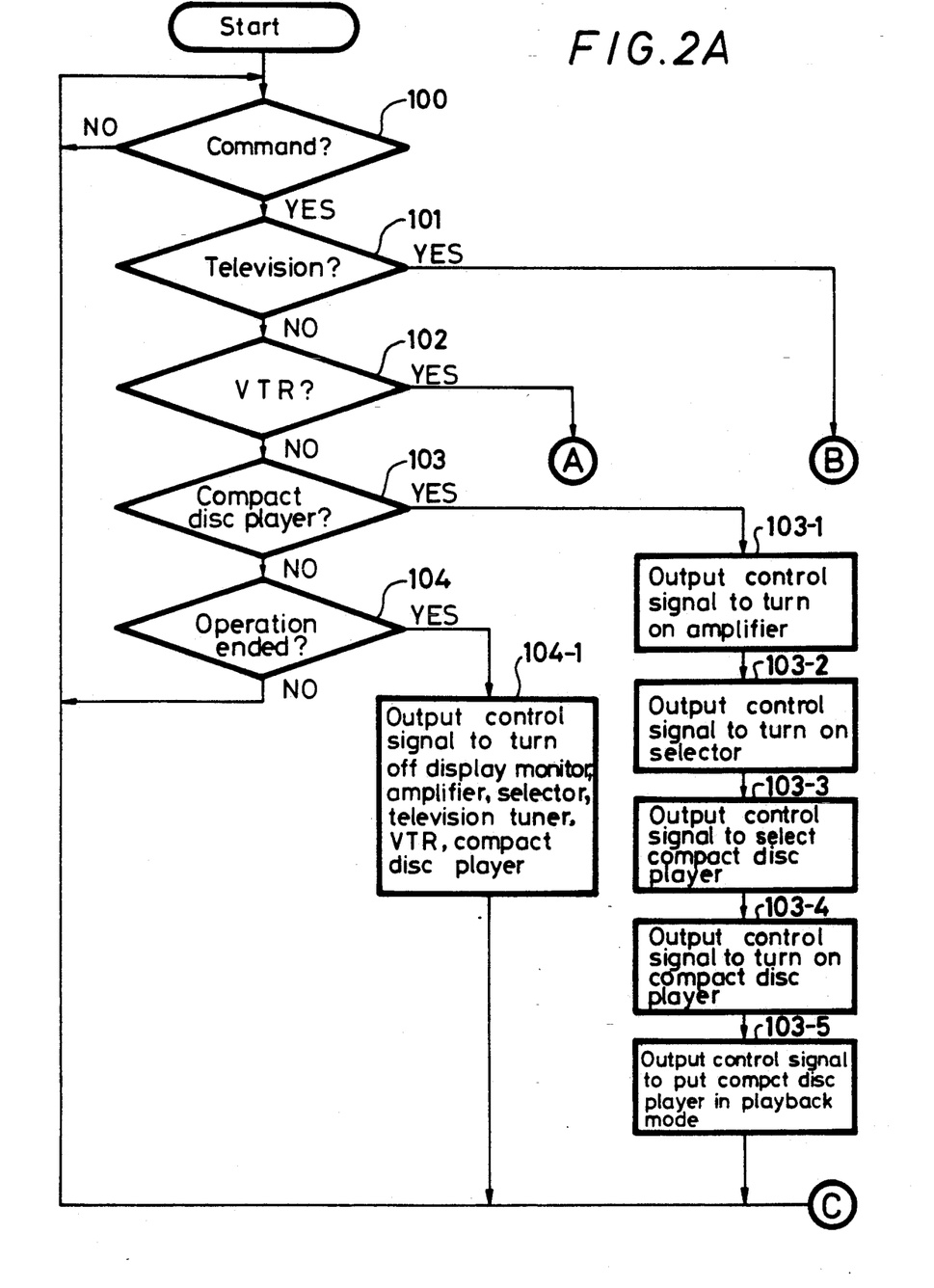
FIGS. 2A and 2B are a flowchart of an operation sequence of the control apparatus shown in FIG. 1.
Figure 2B:
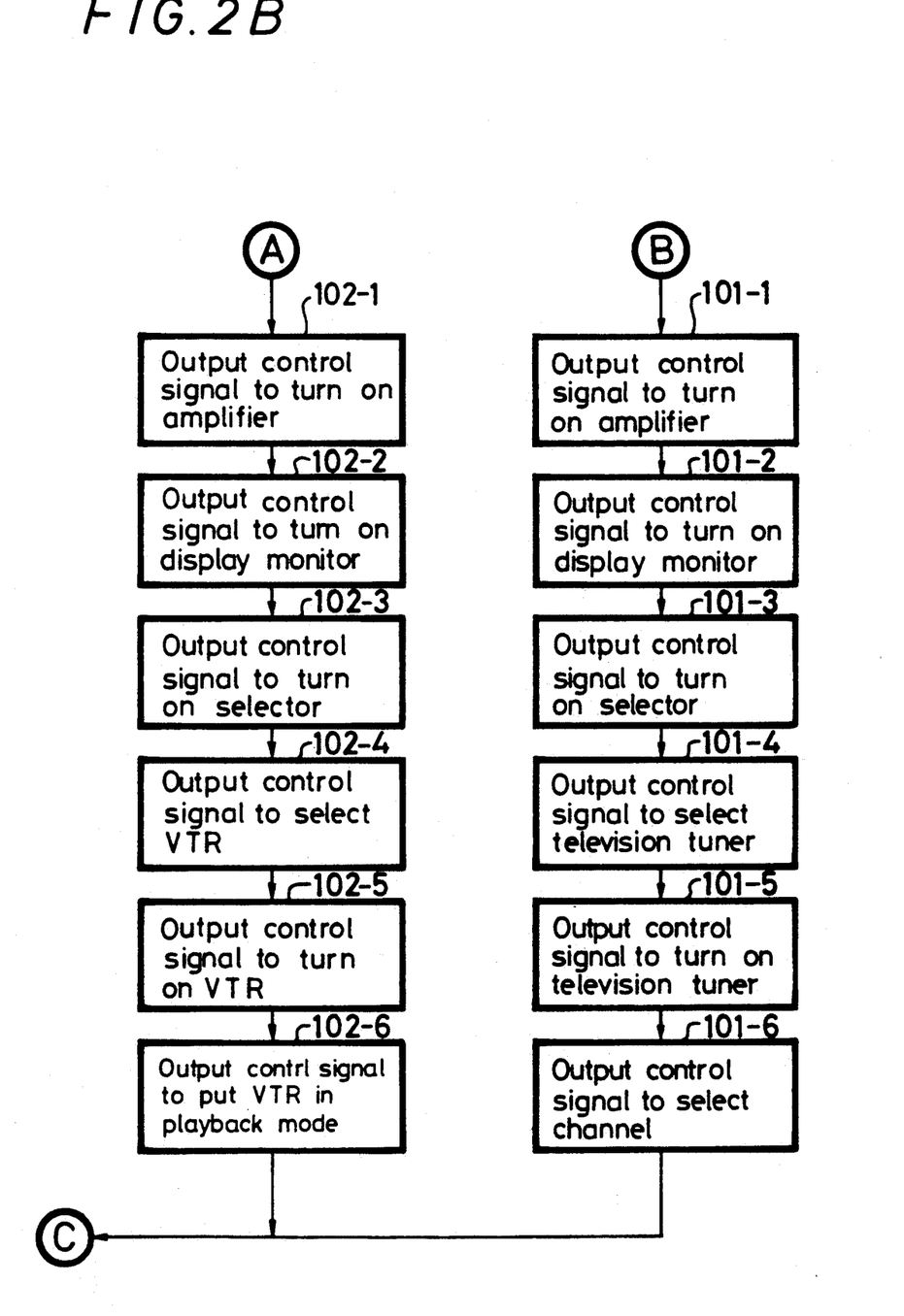

Operation of the audiovisual system shown in FIG. 1 will be described below with reference to FIGS. 2A and 2B.

It is assumed that the user of the audiovisual system has supplied a command to select a television broadcast in a certain television channel from the infrared remote commander to the audiovisual system.

The command from the infrared remote commander is detected by the photosensor 2 and supplied to the microcomputer 3, which then supplies the command through the bus line 20 to the microcomputer 9 (hereinafter also referred to as the "main microcomputer 9"). The main microcomputer 9 determines in a step 100 whether the supplied data is a command or not. If yes, then control goes to a step 101, and if not, then control goes back to the step 100.

In the step 101, the main microcomputer 9 determines whether the command is a command for receiving a television broadcast or not. If yes, then control goes to a step 101-1, and if not, then control goes to a step 102. Since the supplied command is a command for receiving a television broadcast in this example, control goes to the step 101-1.

In the step 101-1, the main microcomputer 9 supplies a control signal to the microcomputer 6 of the amplifier 5 through the bus line 20, enabling the microcomputer 6 to turn on the power supply of the amplifier 5. Then, control goes from the step 101-1 to a step 101-2.

In the step 101-2, the main microcomputer 9 supplies a control signal to the microcomputer 3 of the display monitor 1 through the bus line 20, enabling the microcomputer 3 to turn on the power supply of the display monitor 1. Then, control goes from the step 101-2 to a step 101-3.

In the step 101-3, the main microcomputer 9 turns on the power supply of the selector 8. Then, control proceeds to a step 101-4.

In the step 101-4, the main microcomputer 9 supplies a control signal to enable the selector 8 to electrically connect the video signal output terminal of the tuner unit 13 and the video signal input terminal of the monitor unit 4 to each other, and also electrically connect the audio signal output terminal of the tuner unit 13 and the audio signal input terminal of the amplifier unit 7 to each other. Thereafter, control goes to a step 101-5.

In the step 101-5, the main microcomputer 9 supplies a control signal to the microcomputer 12 of the television tuner 11 through the bus line 20, enabling the microcomputer 12 to turn on the power supply of the tuner 11. Then, control goes from the step 101-5 to step 101-6.

In the step 101-6, the main microcomputer 9 supplies another control signal to the microcomputer 12 of the television tuner 11 through the bus line 20, enabling the microcomputer 12 to control the tuner unit 13 to select the desired television station or channel. The display monitor 1 now displays, on its screen, video images of the television broadcast that is being received by the tuner unit 13, and the loudspeakers 21 radiate audible sounds represented by the audio signal of the television broadcast received by the tuner unit 13.

Therefore, the user can immediately enjoy the selected television broadcast on the audiovisual system simply by selecting the number of the desired television channel with the infrared remote commander. Then, control returns to the step 100.

In the above example, the number of a desired television channel for a television broadcast is selected by the user with the infrared remote commander. However, the user may select a desired television channel by pushing a channel selection switch (not shown) on the television tuner 11. The photosensor 2 may be provided on the television tuner 11 rather than the display monitor 1.

Now, the user supplies a command to play back a magnetic video tape in the VTR 14 from the infrared remote commander to the audiovisual system in order to reproduce recorded video images and sounds from the magnetic video tape.

The command from the infrared remote commander is detected by the photosensor 2 and supplied to the microcomputer 3, which then supplies the command through the bus line 20 to the main microcomputer 9. The main microcomputer 9 determines in the step 100 whether the supplied data is a command or not. If yes, then control goes to the step 101, and if not, then control goes back to the step 100.

In the step 101, the main microcomputer 9 determines whether the command is a command for receiving a television broadcast or not. If yes, then control goes to the step 101-1, and if not, then control goes to the step 102. In this example, control goes to the step 102.

In the step 102, the main microcomputer 9 determines whether the command is a command to play back a magnetic video tape or not. If yes, then control goes to a step 102-1, and if not, then control goes to a step 103. Since the supplied command is a command to play back a video tape in this example, control goes to the step 102-1.

In the step 102-1, the main microcomputer 9 supplies a control signal to the microcomputer 6 of the amplifier 5 through the bus line 20, enabling the microcomputer 6 to turn on the power supply of the amplifier 5. Then, control goes from the step 102-1 to a step 102-2.

In the step 102-2, the main microcomputer 9 supplies a control signal to the microcomputer 3 of the display monitor 1 through the bus line 20, enabling the microcomputer 3 to turn on the power supply of the display monitor 1. Then, control goes from the step 102-2 to a step 102-3.

In the step 102-3, the main microcomputer 9 turns on the power supply of the selector 8. Then, control proceeds to a step 102-4.

In the step 102-4, the main microcomputer 9 supplies a control signal to enable the selector 8 to electrically connect the video signal output terminal of the VTR unit 16 and the video signal input terminal of the monitor unit 4 to each other, and also electrically connect the audio signal output terminal of the VTR unit 16 and the audio signal input terminal of the amplifier unit 7 to each other. Thereafter, control goes to a step 102-5.

In the step 102-5, the main microcomputer 9 supplies a control signal to the microcomputer 15 of the VTR 14 through the bus line 20, enabling the microcomputer 15 to turn on the power supply of the VTR 14. Then, control goes from the step 102-5 to step 102-6.

In the step 102-6, the main microcomputer 9 supplies another control signal to the microcomputer 15 of the VTR 14 through the bus line 20, enabling the microcomputer 15 to place the VTR 14 in a playback mode. The display monitor 1 now displays, on its screen, video images reproduced from magnetic video tape, and the loudspeakers 21 radiate audible sounds represented by the audio signal reproduced from the magnetic video tape.

Therefore, the user can immediately enjoy the video images and sounds reproduced from the magnetic video tape by the VTR 14 on the audiovisual system simply by selecting the playback mode of the VTR 14 with the infrared remote commander. Then, control returns to the step 100.

While the playback mode of the VTR 14 is selected by the user with the infrared remote commander in the above example, the user may select the playback mode of the VTR 14 by pushing a playback button (not shown) on the VTR 14. The photosensor 2 may be provided on the VTR 14 rather than the display monitor 1.

Now, the user supplies a command to play back a compact disc in the compact disc player 17 from the infrared remote commander to the audiovisual system in order to reproduce recorded sounds from the compact disc.

The command from the infrared remote commander is detected by the photosensor 2 and supplied to the microcomputer 3, which then supplies the command through the bus line 20 to the main microcomputer 9. The main microcomputer 9 determines in the step 100 whether the supplied data is a command or not. If yes, then control goes to the step 101, and if not, then control goes back to the step 100.

In the step 101, the main microcomputer 9 determines whether the command is a command for receiving a television broadcast or not. If yes, then control goes to the step 101-1, and if not, then control goes to the step 102. In this example, control goes to the step 102.

In the step 102, the main microcomputer 9 determines whether the command is a command to play back a magnetic video tape or not. If yes, then control goes to a step 102-1, and if not, then control goes to the step 103. In this example, control goes to the step 103.

In the step 103, the main microcomputer 9 determines whether the command is a command to play back a compact disc or not. If yes, then control goes to a step 103-1, and if not, then control goes to a step 104. Since the supplied command is a command to play back a compact disc in this example, control goes to the step 103-1.

In the step 103-1, the main microcomputer 9 supplies a control signal to the microcomputer 6 of the amplifier 5 through the bus line 20, enabling the microcomputer 6 to turn on the power supply of the amplifier 5. Then, control goes from the step 103-1 to a step 103-2.

In the step 103-2, the main microcomputer 9 turns on the power supply of the selector 8. Then, control proceeds to a step 103-3.

In the step 103-3, the main microcomputer 9 supplies a control signal to enable the selector 8 to electrically connect the audio signal output terminal of the compact disc player unit 19 and the audio signal input terminal of the amplifier unit 7 to each other. Thereafter, control goes to a step 103-4.

In the step 103-4, the main microcomputer 9 supplies a control signal to the microcomputer 18 of the compact disc player 17 through the bus line 20, enabling the microcomputer 18 to turn on the power supply of the compact disc player 17. Then, control goes from the step 103-4 to step 103-5.

In the step 103-5, the main microcomputer 9 supplies another control signal to the microcomputer 18 of the compact disc player 17 through the bus line 20, enabling the microcomputer 18 to place the compact disc player 17 in a playback mode. The loudspeakers 21 now radiate audible sounds represented by the audio signal which is reproduced from the compact disc by the compact disc player 17.

Therefore, the user can immediately enjoy the sounds reproduced from the compact disc by the compact disc player 17 on the audiovisual system simply by selecting the playback mode of the compact disc player 17 with the infrared remote commander. Then, control returns to the step 100.

While the playback mode of the compact disc player 17 is selected by the user with the infrared remote commander in this example, the user may select the playback mode of the compact disc player 17 by pushing a playback button (not shown) on the compact disc player 17. The photosensor 2 may be provided on the compact disc player 17 rather than the display monitor 1.

If the command is not a command to play back a compact disc player in the step 103, then control goes from the step 103 to the step 104. If the user supplies a command to stop the operation of the audiovisual system, e.g., a command to turn off the power supply of the audiovisual system, with the infrared remote commander, then control proceeds from the step 104 to a step 104-1.

In the step 104-1, the main microcomputer 9 supplies control signals to the microcomputers 3, 6, 12, 15, 18 of the display monitor 1, the amplifier 5, the television tuner 11, the VTR 14, and the compact disc player 17, respectively, through the bus line 20. In response to the supplied control signals, the microcomputers 3, 6, 12, 15, 18 turn off the power supplies of the display monitor 1, the amplifier 5, the television tuner 11, the VTR 14, and the compact disc player 17, respectively. At the same time, the main microcomputer 9 turns off the power supply of the selector 8. Thereafter, control goes back to the step 100.

When a desired television station is selected by the channel selection switch on the television tuner 11, the playback button on the VTR 14 is pushed, and the playback button on the compact disc player 17 is pushed, the microcomputers 12, 15, 18 transmit the commands through the bus line 20 to the main microcomputer 9.

Figure 3A:
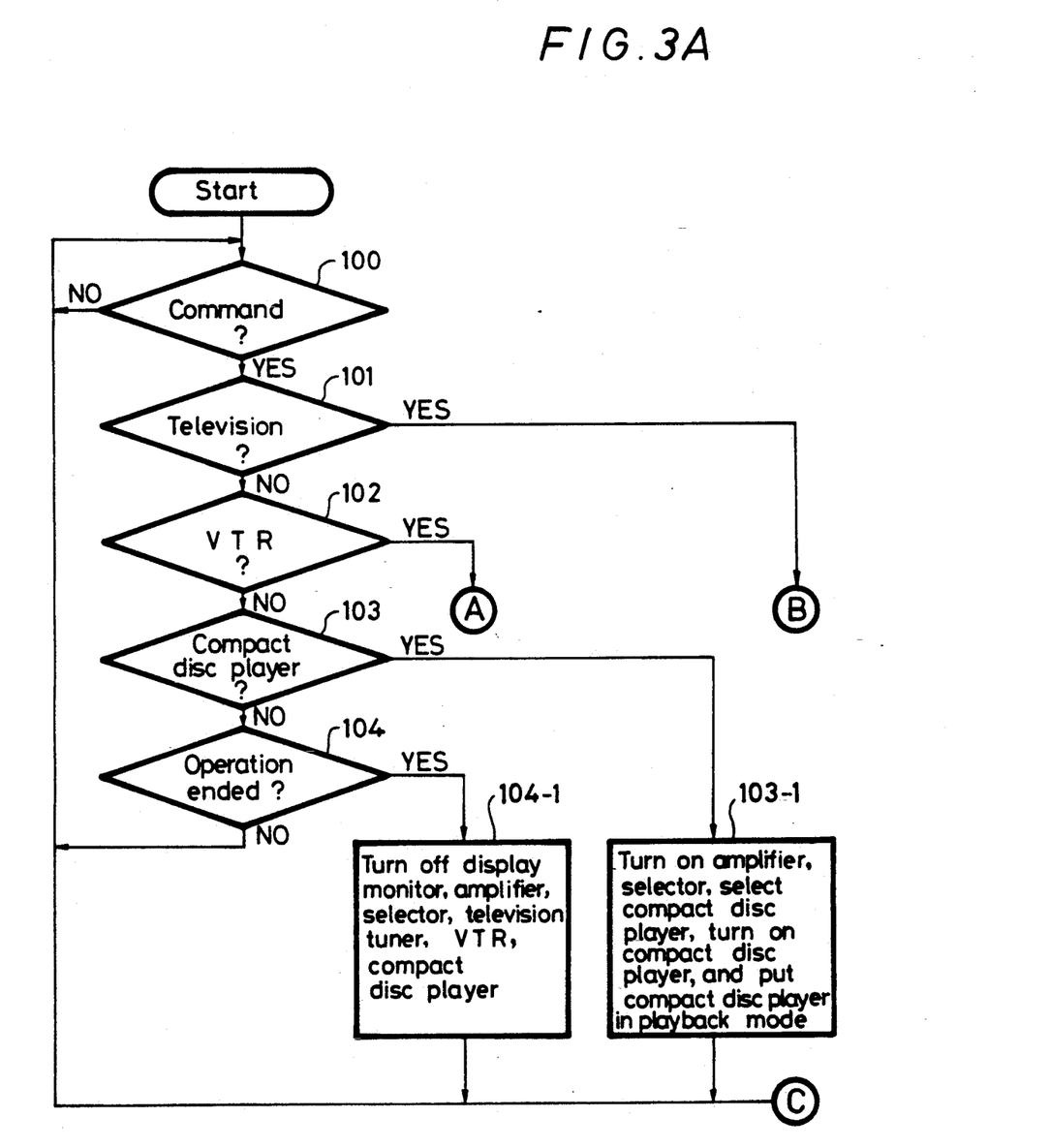
FIGS. 3A and 3B are a flowchart of an operation sequence of a control apparatus according to another embodiment of the present invention.
Figure 3B:
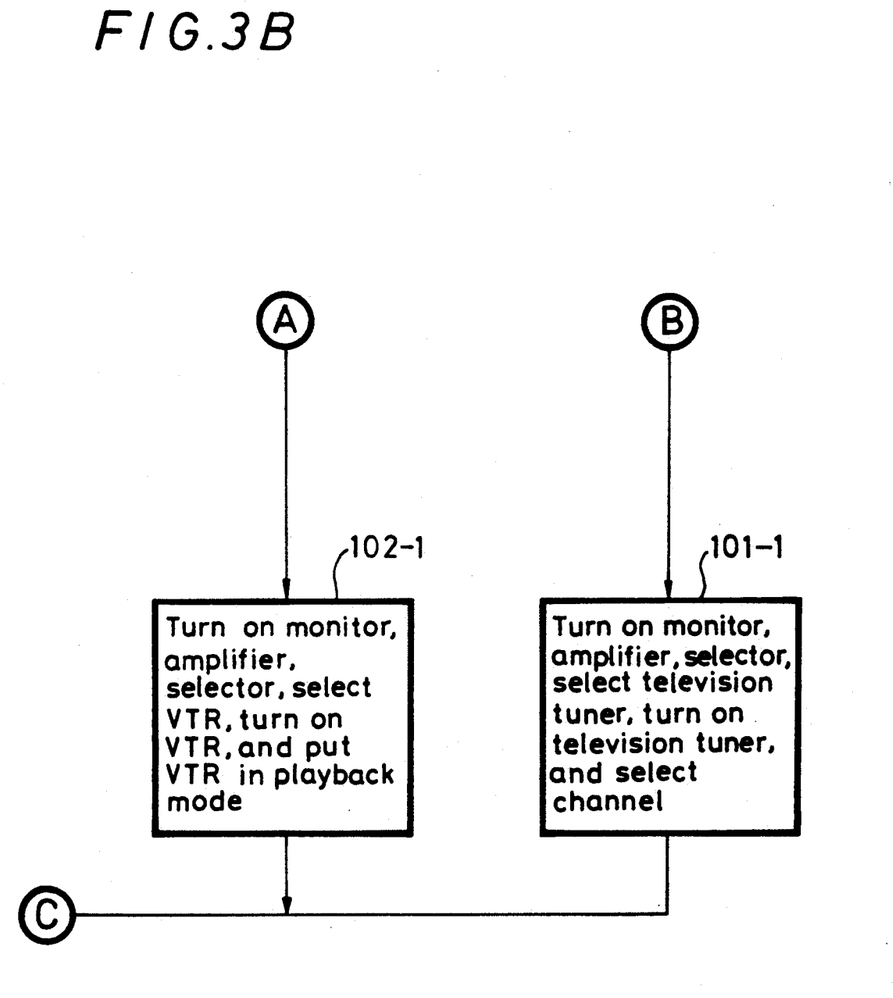

FIGS. 3A and 3B show an operation sequence of a control apparatus according to another embodiment of the present invention. The control apparatus is incorporated in essentially the same audiovisual system as that shown in FIG. 1, except that each of the microcomputers has the same functions as those of the main microcomputer 9 shown and described with reference to FIGS. 1, 2A, and 2B.

It is assumed that the user of the audiovisual system has supplied a command to select a television broadcast in a certain television channel from the infrared remote commander to the audiovisual system.

The command from the infrared remote commander is detected by the photosensor 2 and supplied to the microcomputer 3, which then supplies the command through the bus line 20 to the microcomputers 6, 9, 12, 15, 18 of the amplifier 5, the selector 8, the television tuner 11, the VTR 14, and the compact disc player 17, respectively. Each of the microcomputers 3, 6, 9, 12, 15, 18 determines in a step 100 whether the supplied data is a command or not. If yes, then control goes to a step 101, and if not, then control goes back to the step 100.

In the step 101, the microcomputers 3, 6, 9, 12, 15, 18 determine whether the command is a command for receiving a television broadcast or not. If yes, then control goes to a step 101-1, and if not, then control goes to a step 102. Since the supplied command is a command for receiving a television broadcast in this example, control goes to the step 101-1.

In the step 101-1, the microcomputer 3 turns on the power supply of the display monitor 1, the microcomputer 6 turns on the power supply of the amplifier 5, and the microcomputer 9 turns on the power supply of the selector 8. Further, the selector unit 10 of the selector 8 electrically connects the video signal output terminal of the tuner unit 13 and the video signal input terminal of the monitor unit 4 to each other, and also electrically the audio signal output terminal of the tuner unit 13 and the audio signal input terminal of the amplifier unit 7 to each other. In addition, the microcomputer 12 turns on the power supply of the television tuner 11, and controls the tuner unit 13 to select the desired television station. The display monitor 1 now displays, on its screen, video images of the television broadcast that is being received by the tuner unit 13, and the loudspeakers 21 radiate audible sounds represented by the audio signal of the television broadcast received by the tuner unit 13.

Therefore, the user can immediately enjoy the selected television broadcast on the audiovisual system simply by selecting the number of the desired television channel with the infrared remote commander. Then, control returns to the step 100.

In the above example, the number of a desired television channel for a television broadcast is selected by the user with the infrared remote commander. However, the user may select a desired television channel by pushing a channel selection switch (not shown) on the television tuner 11. The photosensor 2 may be provided on the television tuner 11 rather than the display monitor 1.

Now, the user supplies a command to play back a magnetic video tape in the VTR 14 from the infrared remote commander to the audiovisual system in order to reproduce recorded video images and sounds from the magnetic video tape.

The command from the infrared remote commander is detected by the photosensor 2 and supplied to the microcomputer 3, which then supplies the command through the bus line 20 to the microcomputers 6, 9, 12, 15, 18. Each of the microcomputers 3, 6, 9, 12, 15, 18 determines in the step 100 whether the supplied data is a command or not. If yes, then control goes to the step 101, and if not, then control goes back to the step 100.

In the step 101, the microcomputers 3, 6, 9, 12, 15, 18 determine whether the command is a command for receiving a television broadcast or not. If yes, then control goes to the step 101-1, and if not, then control goes to the step 102. In this example, control goes to the step 102.

The step 102 determines whether the supplied command is a command for playing back a magnetic video tape or not. If yes, then control proceeds to a step 102-1, and if not, then control goes to a step 103. Since the supplied command is a command for playing back the magnetic video tape, control goes to the step 102-1.

In the step 102-1, the microcomputer 3 turns on the power supply of the display monitor 1, the microcomputer 6 turns on the power supply of the amplifier 5, and the microcomputer 9 turns on the power supply of the selector 8. Further, the selector unit 10 of the selector 8 electrically connects the video signal output terminal of the VTR unit 16 and the video signal input terminal of the monitor unit 4 to each other, and also electrically connects the audio signal output terminal of the VTR unit 16 and the audio signal input terminal of the amplifier unit 7 to each other. In addition, the microcomputer 15 turns on the power supply of the VTR 14, and places the VTR 14 in a playback mode. The display monitor 1 now displays, on its screen, video images reproduced from the magnetic video tape which is being played back by the VTR unit 16, and the loudspeakers 21 radiate audible sounds represented by the audio signal which is reproduced from the magnetic video tape by the VTR 14.

Therefore, the user can immediately enjoy the video images and sounds reproduced from the magnetic video tape by the VTR 14 on the audiovisual system simply by selecting the playback mode of the VTR 14 with the infrared remote commander. Then, control returns to the step 100.

While the playback mode of the VTR 14 is selected by the user with the infrared remote commander in the above example, the user may select the playback mode of the VTR 14 by pushing a playback button (not shown) on the VTR 14. The photosensor 2 may be provided on the VTR 14 rather than the display monitor 1.

Now, the user supplies a command to play back a compact disc in the compact disc player 17 from the infrared remote commander to the audiovisual system in order to reproduce recorded sounds from the compact disc.

The command from the infrared remote commander is detected by the photosensor 2 and supplied to the microcomputer 3, which then supplies the command through the bus line 20 to the microcomputers 6, 9, 12, 15, 18. Each of the microcomputers 3, 6, 9, 12, 15, 18 determines in the step 100 whether the supplied data is a command or not. If yes, then control goes to the step 101, and if not, then control goes back to the step 100.

In the step 101, the microcomputers 3, 6, 9, 12, 15, 18 determine whether the command is a command for receiving a television broadcast or not. If yes, then control goes to the step 101-1, and if not, then control goes to the step 102. In this example, control goes to the step 102.

The step 102 determines whether the supplied command is a command for playing back a magnetic video tape or not. If yes, then control proceeds to the step 102-1, and if not, then control goes to the step 103. In this example, control goes to the step 103.

The step 103 determines whether the supplied data is a command for playing back a compact disc or not. If yes, control goes to a step 103-1, and if not control goes to a step 104. Since the supplied command is a command for playing back the compact disc, control goes to the step 103-1.

In the step 103-1, the microcomputer 6 turns on the power supply of the amplifier 5, and the microcomputer 9 turns on the power supply of the selector 8. Further, the selector unit 10 of the selector 8 electrically connects the audio signal output terminal of the compact disc player 17 and the audio signal input terminal of the amplifier unit 7 to each other. In addition, the microcomputer 17 turns on the power supply of the compact disc player 17, and places the compact disc player 17 in a playback mode. The loudspeakers 21 now radiate audible sounds represented by the audio signal reproduced from the compact disc by the compact disc player 17.

Therefore, the user can immediately enjoy the sounds reproduced from the compact disc by the compact disc player 17 on the audiovisual system simply by selecting the playback mode of the compact disc player 17 with the infrared remote commander. Then, control returns to the step 100.

While the playback mode of the compact disc player 17 is selected by the user with the infrared remote commander in the above example, the user may select the playback mode of the compact disc player 17 by pushing a playback button (not shown) on the compact disc player 17. The photosensor 2 may be provided on the compact disc player 17 rather than the display monitor 1.

If the command is not a command to play back a compact disc player in the step 103, then control goes from the step 103 to the step 104. If the user supplies a command to stop the operation of the audiovisual system, e.g., a command to turn off the power supply of the audiovisual system, with the infrared remote commander, then control proceeds from the step 104 to a step 104-1.

In the step 104-1, the microcomputers 3, 6, 9, 12, 15, 18 turn off the power supplies of the display monitor 1, the amplifier 5, the selector 8, the television tuner 11, the VTR 14, and the compact disc player 17, respectively. Then, control returns to the step 100.

When a desired television station is selected by the channel selection switch on the television tuner 11, the playback button on the VTR 14 is pushed, and the playback button on the compact disc player 17 is pushed, the microcomputers 12, 15, 18 transmit the commands through the bus line 20 to the main microcomputer 9.

As described above, in order to either receive a television broadcast, or play back a magnetic video tape, or play back a compact disc on the audiovisual system which comprises the display monitor 1, the amplifier 5, the selector 8, the television tuner 11, the VTR 14, and the compact disc player 17, for example, the user of the audiovisual system is required to enter a command only once, and hence will find it easy and efficient to operate on the audiovisual system.

To the illustrated audiovisual system, there may be added other components, e.g., a video disc player, a digital audio tape recorder, etc. The audiovisual system can be controlled in the same manner as described above when video and audio signals received by the television tuner unit 13 of the television tuner 11 are to be recorded on a magnetic video tape by the VTR 14.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

I claim as my invention:

1. A television audio system comprising:
   a television and television control means;
   an amplifier and amplifier control means;
   a tuner and tuner control means;
   a video tape recorder and video tape recorder control means; and
   a compact disc player and compact disc player control unit;
   a selector unit and selector control means;
   wherein said selector control means has a plurality of different programming modes and said television control means, amplifier control means, tuner control means, video tape recorder control means, and compact disc player control means are connected to said selector control means and responsive to said selector control means in accordance with said plurality of different programming nodes, and;

wherein in a first of said plurality of different programming modes, an output signal is provided to turn on said amplifier, an output signal is provided to turn on said television, an output signal is provided to turn on said selector unit, an output signal is provided to select said tuner, an output signal is provided to turn on said tuner and an output signal is provided to select a channel.

2. A television audio system comprising:
a television and television control means;
an amplifier and amplifier control means;
a tuner and tuner control means;
a video tape recorder and video tape recorder control means; and
a compact disc player and compact disc player control unit;
a selector unit and selector control means;
wherein said selector control means has a plurality of different programming modes and said television control means, amplifier control means, tuner control means, video tape recorder control means, and compact disc player control means are connected to said selector control means and responsive to said selector control means in accordance with said plurality of different programming modes and wherein a second of said plurality of different programming modes, an output signal is provided to turn on said amplifier, an output signal is provided to turn on said television, an output signal is provided to turn on said selector, an output signal is provided to select said tape recorder, an output signal is provided to turn on said tape recorder, and an output signal is provided to put said tape recorder in a playback mode.

3. A television audio system comprising:
a television and television control means;
an amplifier and amplifier control means;
a tuner and tuner control means;
a video tape recorder and video tape recorder control means; and
a compact disc player and compact disc player control unit;
a selector unit and selector control means;
wherein said selector control means has a plurality of different programming modes and said television control means, amplifier control means, tuner control means, video tape recorder control means, and compact disc player control means are connected to said selector control means and responsive to said selector control means in accordance with said plurality of different programming modes and wherein in a third of said plurality of different programming modes, an output signal is provided to turn on said amplifier, an output signal is provided to turn on said selector, an output signal is provided to select said compact disc player, and output signal is provided to turn on said compact disc player, and an output signal is provided to put said compact disc player in a playback mode.

* * * * *